May 2, 1967  B. G. HULLEY  3,316,737
FLEXIBLE COUPLING
Filed Jan. 25, 1965

Inventor
Bruce G. Hulley
By Donald C. McLoughey
Attorney

United States Patent Office 3,316,737
Patented May 2, 1967

3,316,737
FLEXIBLE COUPLING
Bruce G. Hulley, Montreal, Quebec, Canada, assignor to Allis-Chalmers Manufacturing Company, Milwaukee, Wis.
Filed Jan. 25, 1965, Ser. No. 427,879
2 Claims. (Cl. 64—13)

This invention relates to an improved coupling of the type which will flex under operative conditions to accommodate angular and parallel misalignment when transmitting torque between two rotating shafts.

In prior designs of flexible couplings, it has been the practice to utilize a pair of hubs each connected to one of the shafts to be coupled. Each hub has driving projections or pins which project into suitable apertures in one or more flexible driving members which are positionable between the hubs. In the installed condition, couplings of this type are sandwichlike in construction with the common flexible driving member being in tight or compressed face to face abutting relation with the inner faces of the two hubs. In some prior constructions, bolts are used to locate and hold the flexible member or members in position. In operation, the load is transmitted from one shaft to the other through the pins or bolts and the flexible driving members.

Where two shafts are to be coupled into driving relationship with each other, it is usual to find that the shafts are misaligned to some degree. Accurate alignment is rare and difficult to achieve as well as being costly. With inaccurate alignment, it is absolutely essential that the coupling be able to accommodate this misalignment of shafts and continue to operate without damage to either the hubs, the driving pins or the driving members. With couplings heretofore used, the tight face to face abutting relationship of the component parts acts to prevent the flexible driving members from distorting a desirable amount to accommodate misalignment of the shafts during operation. Resistance to distortion of the flexible driving members serves to overload the coupling and the driving and driven elements which are connected to the shafts.

Accordingly, it is the general object of this invention to provide an improved flexible coupling which will operate under angular and parallel misalignment without placing the driving or driven components of the coupling under excessive load.

It is another object of this invention to provide the coupling constructed to afford a predetermined spacing between the hubs and the flexible driving members of the coupling.

It is another object of this invention to provide a flexible coupling in which destructive metal to metal contact between component parts is prevented.

It is a further object of this invention to provide a coupling wherein there will always be full driving contact between the driving pins and the associated flexible driving member regardless of angular distortion.

It is a still further object of this invention to provide a coupling in which the driving hubs may be reduced in thickness without any loss of stability without reducing the torque transmitting area along the length of the hub bore.

It is a still further object of this invention to provide a flexible coupling which will permit the shaft of an electric sleeve bearing motor to float axially without interference in the operation of the coupling.

These and other objects of the invention will become apparent from the following description of one embodiment of the invention.

Referring to the drawings, FIG. 1 is an end view of the coupling;

Figure 1:
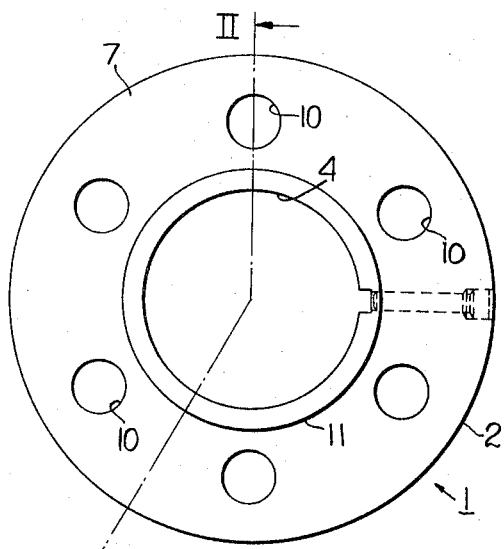
Figure 2:
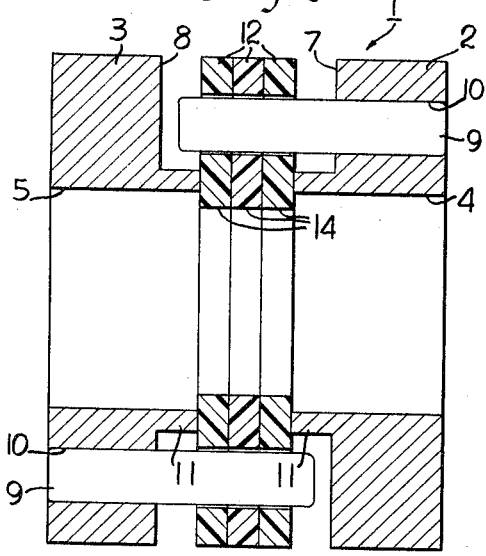
FIG. 2 is a sectional view of the coupling taken along line II—II of FIG. 1.
Figure 4:
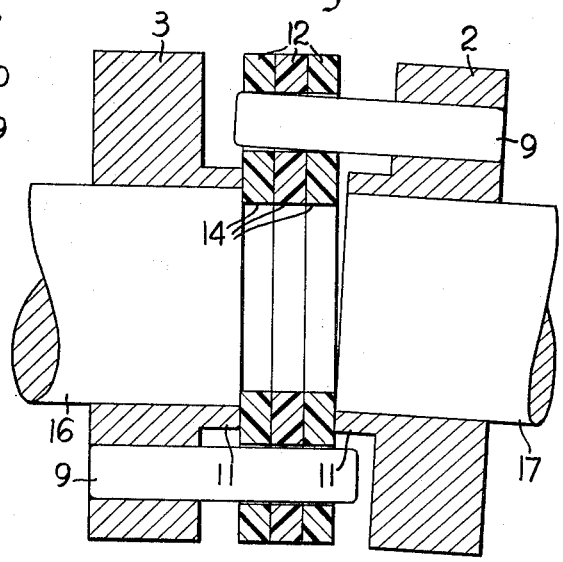
FIG. 4 is a sectional view of the coupling similar to that shown in FIG. 2 but showing the coupling in a condition of angular misalignment.

Referring to FIGS. 1 and 2, the coupling 1 comprises a pair of hubs 2 and 3, having bores 4 and 5 and inner faces 7, 8, respectively. A series of driving pin receiving apertures 10 are provided adjacent the outer periphery of each of the hubs 2 and 3. A driving pin 9 is rigidly secured in each aperture in a suitable manner.

Each hub is provided with a spacing means or element in the form of an annular flange 11 which is secured to the inner face of the hub. It will be appreciated that the spacer element may be formed as a separate piece adapted to be fitted about the shaft upon which the coupling hub is mounted.

Figure 3:
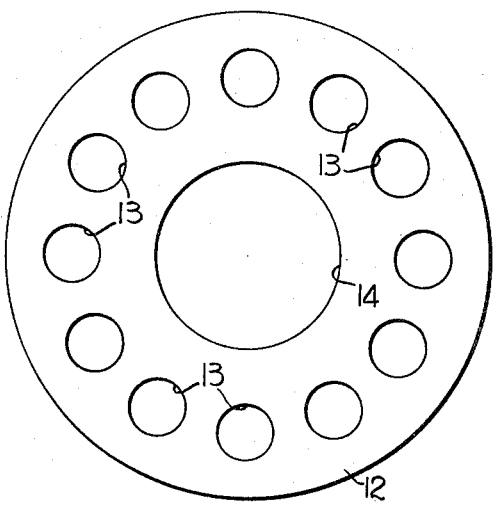
FIG. 3 is an end view of one of the driving members shown in FIG. 2.

Driving torque is transmitted from the series of pins 9 of hub 2 to the series of pins 9 of hub 3 through one or more flexible driving members 12. As shown in FIG. 3, each of the driving members 12 includes a plurality of driving pin receiving apertures 13 which correspond in number to the total number of driving pins utilized by both of the coacting hubs. The circumferential spacing of the apertures 13 is such that the pins 9 of each driving hub will fit into alternate apertures in each of said said driving members. As shown, the flexible driving member 12 includes a central bore 14. It is not necessary in actual operation to provide this central bore.

In assembly, the hubs 2 and 3 are mounted on the shafts 16 and 17 which are to be coupled together for rotation. The hubs are separated axially a sufficient distance to permit insertion of the desired number of flexible driving members between the driving pins. It will be appreciated that any number of flexible driving members can be utilized depending upon the desired torque capacity of the coupling and the length of the driving pins 9. With the flexible driving members in position, the hubs are moved toward one another while orientating the driving pins 9 on hub 2 to interdigitate with pins 9 on hub 3. The pins 9 of each individual hub project through alternate ones of the apertures in the driving members 12. Movement is continued until the annular spacing element 11 on the inner face of each hub comes into contact with the facing surface of its adjacent flexible driving member 12.

The provision of the annular spacer elements 11 serves several desirable functions. By providing a space adjacent the inner face of each coupling hub 2, 3, the flexible driving member will be permitted to distort a desirable amount when assuming load. If the flexible driving member closely abutted or contacted the inner face of the hub, this distortion would not be permitted and undue strain would be placed on the coupling. The use of an annular spacing element 11 also provides additional bearing area along the length of the shaft and thereby makes it possible to have a stable hub even though the hub flange thickness has been reduced. As a practical matter, it is possible to reduce the hub thickness an amount equal to the axial extent of the radial spacing member when the radial spacing member is an integral part of the hub. Reduction of hub thickness permits the maximum coupling weight to be reduced thus lowering both manufacturing cost and mass effect.

In sleeve type electrical motors the rotor shaft normally will have axial end play. When using the coupling with a sleeve bearing motor the coupling hubs 2 and 3 can be mounted on the shafts with a slight gap between the face of the driving member 12 and the annulus 11. This space will allow the driving members 12 and the pins 9 to move relative to each other to accommodate any axial floating of the motor shaft.

The use of an annular spacing element 11 further simplifies the construction of the coupling element. With the existence of the space between the hub face and the flexible driving member, it is not necessary to machine individual recesses in the face of each hub to receive the free end of each individual driving pin 9 as was the practice in prior couplings.

The embodiments of the invention for which an exclusive property or privilege is claimed are defined as follows:

1. A flexible coupling for connecting axially separated rotating shafts together comprising: a pair of shafts; a pair or hubs each having an inner face; means for securing one of said hubs on each said shafts; a flexible driving member positioned between said inner faces of said hubs and having apertures therethrough extending generally parallel to said shafts; a plurality of axially extending driving pins mounted on each of said hubs with the pins on one of said hubs being interdigitated with the pins on the other of said hubs and projecting through alternate ones of said apertures in said driving member; and a nondriving spacer means positioned adjacent said shafts to extend axially between each of said inner faces and said driving member, said spacer element extending radially outward from said shaft a distance less than the radial distance of said pins from said shaft to provide a continuous annular relieved area into which said pins project.

2. A flexible coupling according to claim 1, wherein said spacer means is formed integrally with said hub.

References Cited by the Examiner
UNITED STATES PATENTS 1,911,846   5/1933   Queen _____ 64—13
1,935,390   11/1933  Brown _____ 64—13

FRED C. MATTERN, JR., *Primary Examiner.*

HALL C. COE, *Examiner.*